Feb. 21, 1967    K. K. KING ET AL    3,304,745
BALL SPLINE ASSEMBLY
Filed April 29, 1965

INVENTORS
Kenneth K. King, &
BY Donald P. Marquis

A. M. Leiter
ATTORNEY

United States Patent Office 3,304,745
Patented Feb. 21, 1967

3,304,745
BALL SPLINE ASSEMBLY
Kenneth K. King and Donald P. Marquis, Saginaw, Mich., assignors to General Motors Corporation, Detroit, Mich., a corporation of Delaware
Filed Apr. 29, 1965, Ser. No. 451,937
13 Claims. (Cl. 64—23)

This invention relates to ball spline assemblies and more particularly to a ball retainer and guide for retaining the balls on one of the ball spline members prior to final assembly and thereafter guiding the balls for recirculation.

The assembly of ball spline members is facilitated by having the balls retained by a ball retainer on one of the ball spline members prior to their mating. Ball recirculation for extensive relative movement between the spline members is afforded by having ball guides for guiding the balls to and from a loaded race, to and from a return path. While the ball retainers and guides of the prior art have proven generally satisfactory, they often do not meet the required standards of versatility of application and simplicity of structure tailored to economical production.

The principle of this invention lies in the provision of ball retainer members secured to guide members which combination is secured to one of the spline members and provides endless troughs freely receivable in accommodating spaces between the spline members for retaining the balls in the ball grooves of the one spline member prior to mating of the spline members. The guide members, along portions of the trough, guide the balls to and from a loaded race, to and from an unloaded ball return path after assembly and during drive transmittal. The invention is illustrated as being employed in a ball spline assembly having an outer spline member which member has pairs of outer races cooperating with pairs of inner races on an inner spline member to provide pairs of co-operating races for receiving balls for torque transmittal. For each associated pair of outer races, there is provided a ball retainer member having an endless trough freely receivable in an accommodating recess in the inner spline member between associated inner races. The ball retainer members are secured at each end to a ball guide member, the latter members being in turn secured to the outer spline member. The ball guide members provide the boundary of portions of the endless troughs which troughs retain the balls in endless trains in the outer races of the outer spline member prior to final assembly of the inner spline member. At final assembly, the endless trains of balls engage their associated pairs of inner races on the inner spline member whereafter the balls are guided between their respective loaded and unloaded races by the ball guide members and associated trough portions upon relative sliding movement between the spline members as one of the spline members is rotated, the loading and unloading of the races being determined by the direction of torque transmittal.

An object of this invention is to provide a new and improved ball retainer for a ball spline.

Another object of this invention is to provide for a ball spline assembly, a ball retainer for retaining the balls on one of the ball spline members and for aiding the guiding of the balls to and from a loaded race, to and from an unloaded ball return path.

Another object of this invention is to provide in a ball spline sub-assembly, a cylindrical member having pairs of longitudinally-extending ball grooves, endless troughs for retaining the balls in the ball grooves and ball guides for providing ball recirculation and for bordering and securing the troughs to the cylindrical member.

These and other objects of the invention will be more apparent from the following description and drawing.

Figure 1:
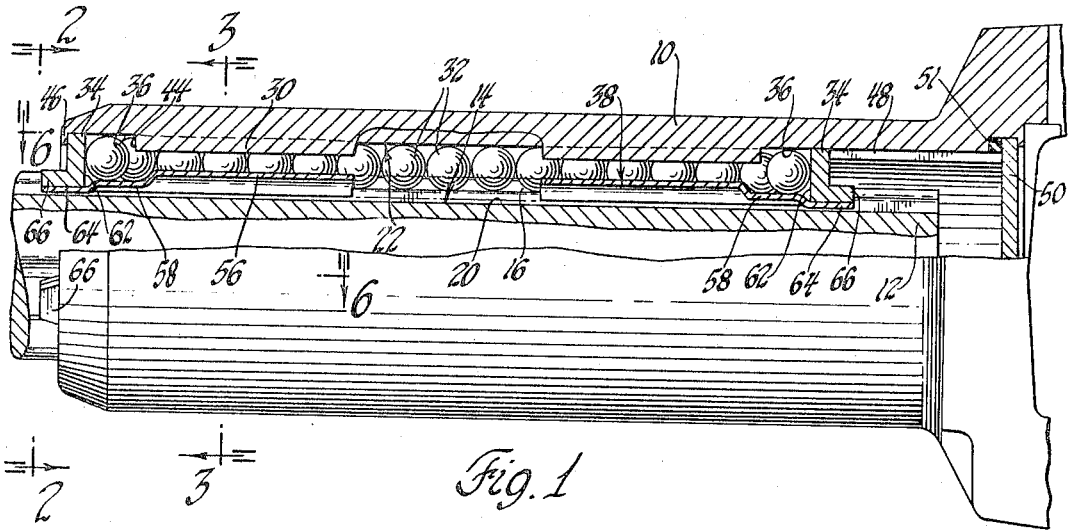
FIGURE 1 is a longitudinal view with parts in section showing a ball spline assembly having a ball retainer and guide constructed according to this invention.
Figure 3:
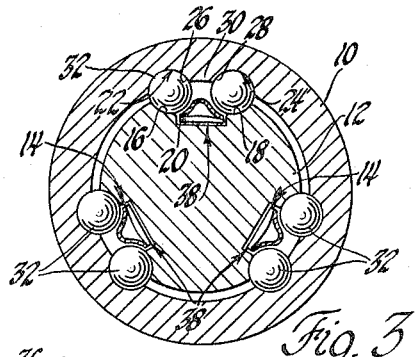
FIGURE 3 is a view taken substantially on the line 3—3 in FIGURE 1.

Referring first to FIGURE 1 of the drawing, the ball spline assembly is for a universal joint and comprises a yoke or outer cylindrical ball spline member 10 encircling and circumjacent an inner cylindrical ball spline member 12. As best shown in FIGURE 3, inner spline member 12 has three external, circumferentially-equally-spaced, parallel and axially-extending grooves 14, each groove providing a pair of circumferentially-spaced inner ball races 16 and 18 and an intermediate recess 20 rectangular in cross section, the purpose of the recesses being more clearly understood from the description of the ball retainer and guide structure described in detail later. For each groove of inner spline member 12, the outer spline member 10 has a pair of internal grooves 22 and 24 providing a pair of outer ball races 26 and 28, respectively, which races are separated by a guide rib 30.

The outer ball races 26 and 28 are complementary to and cooperate with the longer inner ball races 16 and 18, respectively, for receiving files of balls 32 to provide the ball spline connection between the spline members. The three, circumferentially-equally-spaced associated pairs of ball races are employed to accurately locate the inner and outer spline members concentrically.

The ball retainer and guide assembly, for retaining the balls on the outer spline member 10 prior to its mating with the inner spline member 12 and for thereafter connecting the ends of the associated pairs of operating complementary races to provide endless ball circuits whereby the files of balls become endless trains of balls, comprises an annular guide member 34 located in a counter-bore 36 at each end of outer spline member 10 as shown in FIGURE 1 and for each pair of grooves 22 and 24 and endless train of balls there is provided a retainer member 38 secured at opposite ends to guide members 34.

Figure 7:
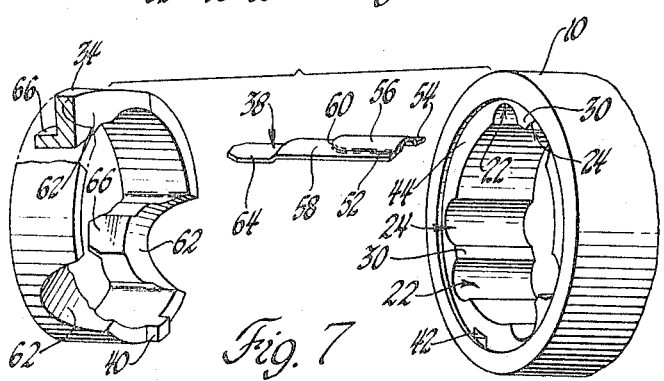
FIGURE 7 is an exploded view of part of the left end of the FIGURE 1 assembly.

The left guide member 34, as viewed in FIGURE 1, has a tongue 40, as shown in FIGURE 7, which is received in a slot 42 in outer spline member 10 to prevent relative angular movement and this guide member is held in position against counterbore step 44 by the flanged left end 46 of member 10 which flange is provided by a spinning operation. The right guide member 34 has an identical tongue and slot connection with member 10 and is held against its counterbore step 44 by a retainer sleeve 48 and a dust plug 50 which has a packing ring 51.

Figure 4:
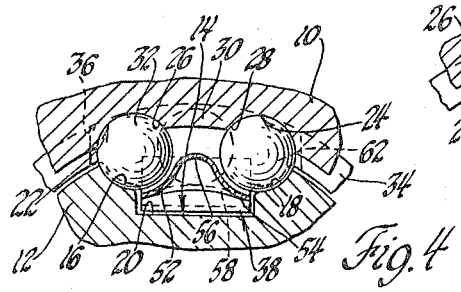
FIGURE 4 is an enlarged view of a portion of FIGURE 3.

The ball retainer members 38 are symmetrical about a vertical axis through their mid point, reference FIGURE 1, with each ball retainer member 38 being preferably of stamped metal construction and having a double-trough, elongated, intermediate portion provided by troughs or rails 52 and 54 arcuate shaped in cross section, as viewed in FIGURE 4, separated by a raised, rounded rib 56 of reverse curvature, which rib projects in the direction of and has clearance with the associated guide rib 30 of the outer spline member 10.

Figure 2:
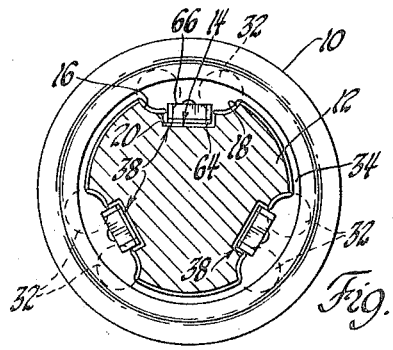
FIGURE 2 is a view taken substantially on the line 2—2 in FIGURE 1.

Confined arcuate paths for connecting the opposite ends of troughs 52 and 54 to provide one endless trough are provided by bridges 58 on each retainer member 38 adjacent rib ends 60, and arcuate guideways 62 provided by arcuate recesses in the inboard sides of guide members 34. The depending inner radial contour of guideways 62 provided by guide members 34 reaches into and follows the contour of the inner ball races 16 and 18 but does not contact these races, as best shown in FIGURE 2.

The bridges 58 extend transverse to the races to bridge recess 20 and are arcuate shaped in cross section, as shown in FIGURE 4, to follow the wall contour of counterbores 36. The difference in radius between the bridges 58 and counterbores 36 slightly exceeds the diameter of the balls to permit unrestricted crossing of the balls during recirculation which is explained in greater detail later. The three ball retainer members 38 are secured at each end to the inner radius of guide members 34 by tabs 64 welded to guide member projections 66. Thus, the guide members 34 support retainer members 38 on outer spline member 10 in fixed positions.

Figure 5:
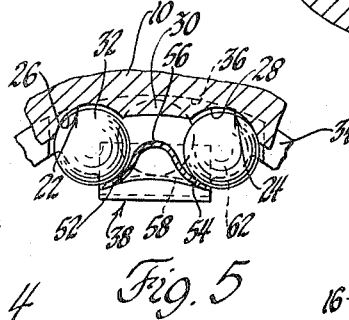
FIGURE 5 is a view like FIGURE 4 but with the inner spline member removed.
Figure 6:
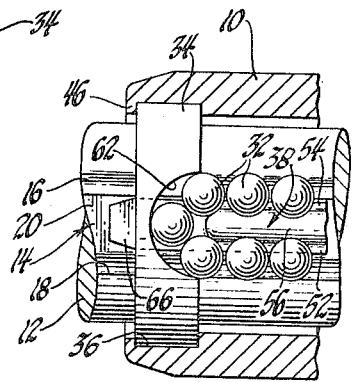
FIGURE 6 is a view taken substantially on the line 6—6 in FIGURE 1.

As best shown in FIGURE 5, prior to insertion of inner spline member 12, the troughs 52 and 54 cooperate with their associated ball grooves 22 and 24, respectively, to prevent the balls from dropping out of their ball grooves, the opening between each trough and the associated ball groove edge opposite the guide rib 30 being less than the diameter of the balls. The balls at the crossovers between the ends of the associated pairs of ball grooves 22 and 24 are held in the counterbores 36 by the bridges 58 and guideways 62. Thus, the ball retainer members and guide members retain the complete trains of endless balls in the outer spline member prior to final assembly and mating of the outer spline member with the inner spline member.

After mating of the spline members, the balls engage the inner ball races of the inner spline member and ride free of the troughs 52 and 54, as best shown in FIGURE 4, the troughs being located at a radius less than the inner radial edge of the inner ball races. The balls are then guided crosswise or transverse of the races between the ends of their operating loaded and unloaded races by the guideways and bridge portions of the endless troughs during torque transmittal and upon sliding movement of one of the spline members relative to the other, the loaded and unloaded races being determined by the direction of torque transmittal.

For example, when the inner spline member 12 is driven in the clockwise direction, as viewed in FIGURE 4, the balls in ball race 16 will be urged against the ball race 26 in the area of guide rib 30, while at the same time the normal clearance in the ball spline connections permits slight clockwise rotation of inner spline member 12 relative to outer spline member 10 so that the balls in ball races 18 and 28 are unloaded. Consequently when the inner spline member 12 is moved in one direction relative to the outer spline member 10, the loaded balls in races 16 and 26 will roll in the direction of movement of inner spline member 12.

The balls rolling in races 16 and 26 will then eventually impinge against one of the guideways 62, pass over recess 20 on the associated bridge while being guided around the associated end of guide rib 30 and then be deflected to the unloaded raceway provided by races 18 and 28. Under these conditions, the balls in races 18 and 28 must move in the direction opposite the direction of movement of the inner spline member 12. These balls thus roll under unloaded conditions until they eventually impinge against the guideway at the opposite end of the ball retainer member whereupon they cross over the associated bridge and are guided for return to the start of the loaded race. This ball recirculation will continue until the relative axial movement is terminated. The complete assembly functions equally as well upon movement of the inner spline member relative to the outer spline member in the opposite direction and when the inner spline member is driven in a counterclockwise direction as viewed in FIGURE 4.

During relative movement between the spline members, the entire ball retainer and guide assembly rides freely of the inner spline member 12, as best shown in FIGURES 2 and 3. This is provided by having sufficient clearance between the troughs and the walls of the inner spline member recesses and between the inner radial contour of the guideways and the inner ball races of the inner spline member.

The above-described preferred embodiment is illustrative of the invention which may be modified within the scope of the appended claims.

We claim:

1. In combination, a cylindrical member having a pair of grooves, antifriction elements in each of said grooves, retainer means including bridge means and rail means for retaining said antifriction elements on said cylindrical member and permitting said antifriction elements to extend a substantial distance beyond said retainer means only along the length of said rail means, guide means on said cylindrical member for cooperating with said bridge means to guide said antifriction elements in an endless train to and from one groove, to and from the other groove and said guide means having means for supporting said retainer means on said cylindrical member.

2. In combination, a cylindrical member having a pair of ball grooves, balls in each of said ball grooves, a ball retainer providing a ball retainer rail for each of said grooves for retaining said balls in said grooves while permitting said balls to extend out of their associated groove a substantial distance past their associated rail and also providing bridges for connecting the adjacent ends of said grooves, ball guides secured to said cylindrical member for cooperating with said bridges to guide said balls in an endless train to and from one groove, to and from the other groove and aid in the retention of said balls and said ball guides having means for connecting said ball retainer to said cylindrical member.

3. In combination, a cylindrical member having a pair of ball grooves, balls in each of said ball grooves, ball retainer means providing an endless trough for retaining said balls on said cylindrical member and permitting said balls to overhang only those portions of said trough extending along the length of said grooves, guide means on said cylindrical member for guiding said balls along portions of said trough to and from the ends of one groove, to and from the ends of the other groove and said guide means having means for connecting said ball retainer means to said cylindrical member to provide the only connection therebetween.

4. In combination, a cylindrical member having a pair of ball grooves, balls in each of said ball grooves, ball retainer means providing an endless trough for retaining said balls on said cylindrical member and permitting the balls in said grooves to extend out of their associated groove beyond said trough a distance less than the radius of said balls and preventing the balls on said trough between said ball grooves from extending beyond said trough, guide means on said cylindrical member for cooperating with said ball retainer means to guide said balls in an endless train to and from the ends of one groove, to and from the ends of the other groove and for supporting said ball retainer means only at its opposite ends in a fixed position on said cylindrical member.

5. In combination, a cylindrical member having a pair of ball grooves, balls in each of said ball grooves, a ball retainer member providing an endless trough having rail portions and bridge portions for retaining said balls on said cylindrical member permitting the balls to extend out of their associated groove only beyond said rail portions, ball guide members secured to said cylindrical member providing arcuate guideways located at the opposite ends of said grooves for guiding said balls along portions of said trough in an endless train to and from one groove, to and from the other groove and cooperating with said bridge portions to aid the ball retention and said ball guide members having means for securing said ball retainer member only at its opposite ends in a fixed position on said cylindrical member.

6. In combination, a cylindrical member having a pair of elongated ball grooves, ball guide members secured to said cylindrical member providing arcuate guideways between the adjacent ends of said ball grooves so that said ball grooves and said guideways provide an endless ball passage, an endless train of balls including two rows of balls in said passage and a ball retainer member secured at opposite ends to said ball guide members having an endless trough for retaining said balls in said passage including elongated trough portions intermediate said rows of balls and with respect to which said balls in said ball grooves overhang a distance less than the radius of said balls and also having bridge portions transverse to said ball grooves for cooperating with said arcuate guideways and said cylindrical member to provide completely enclosed passage portions connecting the adjacent ends of said ball grooves.

7. The combination set forth in claim 6 and said ball retainer member being secured to said ball guide members by welds.

8. In combination, a cylindrical member having pairs of circumferentially-spaced, longitudinally-extending ball grooves, said cylindrical member having annular recesses at the ends of said grooves, an annular guide member secured to said cylindrical member in each said recess providing arcuate guideways between the adjacent ends of said pairs of grooves so that said pairs of grooves and associated guideways provide endless ball passages, an endless train of balls in each said endless ball passage, an elongated ball retainer member for each said endless ball passage secured at opposite ends to said guide members at said guideways and providing an endless trough, each said trough having elongated, side by side trough portions having clearances with respect to the outer edges of their associated pair of grooves of a distance less than the diameter of the balls so that said balls in said grooves project beyond said intermediate trough portions a distance less than the radius of said balls and are retained in their associated grooves and each said trough further having bridge portions extending between the ends of said elongated trough portions and adjacent said guideways so that said balls on said bridge portions are retained in said recesses.

9. In a ball spline assembly the combination of a first cylindrical member having a pair of circumferentially-spaced grooves, a second cylindrical member telescopically related to said first cylindrical member and having a groove cooperable with said first member grooves to provide a pair of circumferentially spaced raceways, antifriction elements in said raceways, guide means secured to one of said members for guiding said antifriction elements in an endless train to and from one raceway, to and from the other raceway and retainer means secured to said guide means for permitting said antifriction elements to extend out of their associated groove in said first cylindrical member beyond said retainer means for contact with said second cylindrical member groove and for retaining said antifriction elements in said first cylindrical member grooves when said second cylindrical member is removed.

10. In a ball spline assembly the combination of telescopically-related members complementary grooved to provide a pair of circumferentially-spaced ball races therebetween, ball retainer means operatively connected to one of said members providing an endless trough, an endless train of balls occupying said endless trough for contact in said races, said trough having rail portions extending along the length of the grooves in said one member providing guides located at the opposite ends of said members are assembled and said trough contacting all of said balls to retain said train of balls on said one member when the other member is removed.

11. In a ball spline assembly the combination of an outer cylindrical member having a pair of races, an inner cylindrical member encircled by said outer cylindrical member having a pair of races cooperating with said first-mentioned pair of races to provide a pair of raceways, ball retainer and guide means secured to said outer member providing guides located at the opposite ends of said first-mentioned pair of races providing together with said pair of raceways an endless ball circuit, an endless train of balls in said ball circuit and said ball retainer and guide means further providing an endless trough for permitting said balls to operate freely in said raceways with said inner and outer spline members assembled and for retaining said balls on said outer spline member when said inner spline member is removed.

12. In a ball spline assembly the combination of an outer cylindrical spline member having a pair of longitudinally-extending, circumferentially-spaced races in an inner bore separated by a guide rib, an inner cylindrical spline member received in said outer spline member and having external, longitudinally-extending races cooperable with said outer spline member races to provide a pair of longitudinally-extending, circumferentially-spaced raceways separated by said guide rib, ball retainer and guide means secured to said outer spline member providing arcuate ball guideways extending crosswise of said outer spline member grooves and across the ends of said guide rib to provide together with said raceways an endless ball passage, balls mounted in said ball passage and movable therealong as said outer spline member and said inner spline member move relative to each other, said ball retainer and guide means further providing a ball retainer rail associated with each of said outer spline member races and extending the length of the associated outer spline member race for permitting said balls to operate in said raceways and for cooperating with said guideways to retain said balls on said outer spline member when said inner spline member is removed.

13. In combination, an outer cylindrical spline member having pairs of circumferentially-spaced, longitudinally-extending grooves, an inner cylindrical spline member received in said outer spline member and having a groove for cooperating with each pair of outer spline member grooves to provide pairs of circumferentially-spaced, longitudinally-extending raceways, said outer spline member having a counterbore at each end whose step meets with the ends of said outer spline member grooves, an annular guide member secured to said outer spline member to abut the step of each said counterbore and having guideways for connecting the adjacent ends of said pairs of outer spline member grooves at said steps, to provide endless ball circuits, said guideways of each said guide member being freely received in said inner spline member groove, an endless train of balls occupying each of said ball circuits, each groove of said inner spline member having a recess located between the associated pair of raceways, a ball retainer member for each said train of balls secured at opposite ends to said guide members providing an endless trough for receiving each said train of balls, said troughs having longitudinal, side by side rail portions extending the length of said outer spline member grooves and freely received in said recesses, said rail portions having clearances with respect to the outer edges of their associated pair of outer spline member grooves of less than the diameter of the balls to permit said balls to extend through said clearances for contact with said raceways, said troughs further having bridge portions connecting the adjacent ends of said rail portions and bridging said recesses for ball travel along said guideways and said troughs engaging said balls along their entire train length to retain said balls in said counterbores and outer spline member grooves with the aid of said guideways when said inner spline member is removed.

References Cited by the Examiner

UNITED STATES PATENTS

| | | | |
|---|---|---|---|
| 2,791,894 | 5/1957 | Duckworth | 64—23.7 |
| 2,908,152 | 10/1959 | Anderson | 64—23 |
| 2,968,358 | 1/1961 | De Lor Ean | 64—23 X |
| 2,983,120 | 5/1961 | White | 64—23 |
| 3,046,808 | 7/1962 | De Mart | 308—6 |
| 3,210,136 | 10/1965 | Anderson | 64—23 X |

FRED C. MATTERN, JR., *Primary Examiner.*

HALL C. COE, *Examiner.*